March 28, 1967 R. B. BAIRD 3,311,692
GRAVURE EMBOSSING OF THERMOPLASTICS
Filed May 8, 1963 3 Sheets-Sheet 1

INVENTOR.
ROBERT B. BAIRD
BY
ATTORNEY

INVENTOR.
ROBERT B. BAIRD

March 28, 1967 R. B. BAIRD 3,311,692
GRAVURE EMBOSSING OF THERMOPLASTICS
Filed May 8, 1963 3 Sheets-Sheet 3

INVENTOR.
ROBERT B. BAIRD
BY
*Walter C. Kehm*
ATTORNEY

United States Patent Office 3,311,692
Patented Mar. 28, 1967

3,311,692
GRAVURE EMBOSSING OF THERMOPLASTICS
Robert B. Baird, Scotch Plains, N.J., assignor to Union
Carbide Corporation, a corporation of New York
Filed May 8, 1963, Ser. No. 278,927
13 Claims. (Cl. 264—293)

This invention relates to the embossing of thermoplastics; more particularly, this invention relates to the embossing of thermoplastics with an intaglio etched member.

Heretofore the decorating of plastic films or sheets has been accomplished by embossing or printing techniques. Printing techniques are primarily employed wherein a great deal of contrast between the decorative pattern and the plastic is desired. In general printing of plastic films or sheets is achieved by conventional printing plates or cylinders, very similar to those employed in the paper printing art (e.g., a photo-engraved cylinder), wherein the ink is deposited onto the plastic sheet from the recessed areas of the plate or cylinder. Embossing techniques have heretofore been employed when the degree of contrast between the embossed pastic and the unembossed area is not critical. Due to inherent limitations in previously employed embossing techniques, the art has always been forced to revert back to conventional printing techniques whenever a highly complicated and decorative pattern such as a photograph or intricate design is to be reproduced upon a plastic sheet or film.

An object of this invention is to provide a method and apparatus suitable for producing intricately embossed thermoplastics that were heretofore not possible.

According to the present invention there is provided a method for preparing intricately designed thermoplastics which comprises heating a sheet of thermoplastic material to a temperature above the softening point of the material; supporting the material with a resilient backing member having a resiliency as evidenced by a depression from 2 to 20 percent when subjected to a force of 100 pounds per square inch for one minute; contacting the material with an intaglio etched rigid member having a plurality of microscopic cells, each respective cell having a cross-sectional dimension of no greater than 22 mils and no less than 8.5 mils, a cross-sectional area ranging from 36 square mils to 230 square mils and a depth ranging from 4 microns to 80 microns; compressing the resiliently supported material against the etched member with a pressure sufficient to force the material into the microscopic cells while maintaining the material at a temperature above the softening point of the material, and thereafter cooling the material.

In another aspect of the present invention there is provided an apparatus for preparing intricately designed sheets of thermoplastic materials comprising, in combination, resilient support means for supporting a thermoplastic material having a resiliency as evidenced by a depression ranging from 2 to 20 percent when subjected to a force of 100 p.s.i. for one minute; an intaglio etched rigid member having a plurality of microscopic cells, each respective cell having a cross-sectional dimension of no greater than 22 mils and no less than 8.5 mils with a cross-sectional area ranging from 36 square mils to 230 square mils and a depth ranging from 4 microns to 80 microns; means for heating a thermoplastic material to a temperature above the softening point of the material, means for applying positive pressure to a sheet of thermoplastic material positioned between the etched member and the resilient support means sufficient to force the thermoplastic material to flow into the microscopic cells and means for cooling the thermoplastic material to below the softening point of the material.

The term "softening point" as employed herein has reference to the temperature at which the film ceases to be self supporting and becomes distorted readily of its own weight.

A fuller understanding of the invention may be had by referring to the description and claims taken in conjunction with the accompanying drawings in which:

Figure 1:
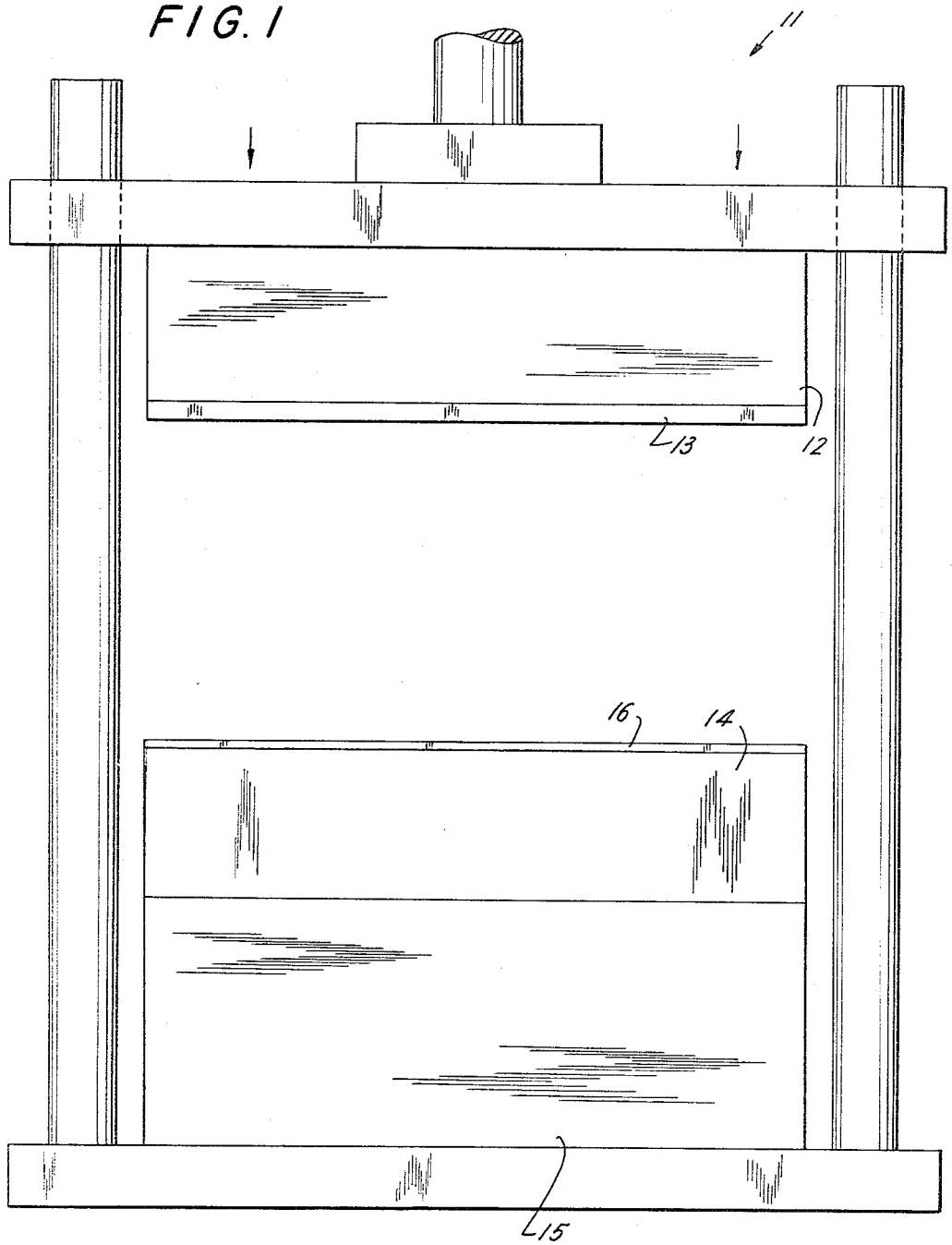
FIGURE 1 is an elevational view showing a suitable apparatus for practicing the method of the invention.

Referring to FIGURE 1 of the drawing, the method of the invention can be accomplished in a press 11 having a thermostatically controlled heating plate 12, an intaglio etched member 13 (to be described hereinafter in detail) and a resilient backing member 14 which in turn is supported by a rigid member 15. The thermoplastic film 16 is placed upon the resilient backing member 14 and the heater intaglio etched member 13 is drawn in close proximity to the thermoplastic film 16 so as to heat the film 16 to a temperature above the softening point of the film. After the film 16 has been heated to a temperature above its softening point, the resiliently supported film 16 is compressed between the etched member 13 and the resilient backing member 14 with a pressure sufficient to force the heated film 16 into the microscopic cells of the intaglio etched member 13. Thereafter the resilient backing member 14 and the intaglio etched member 13 are disengaged and the film 16 is allowed to cool thus forming an intricately embossed thermoplastic sheet.

Figure 2:
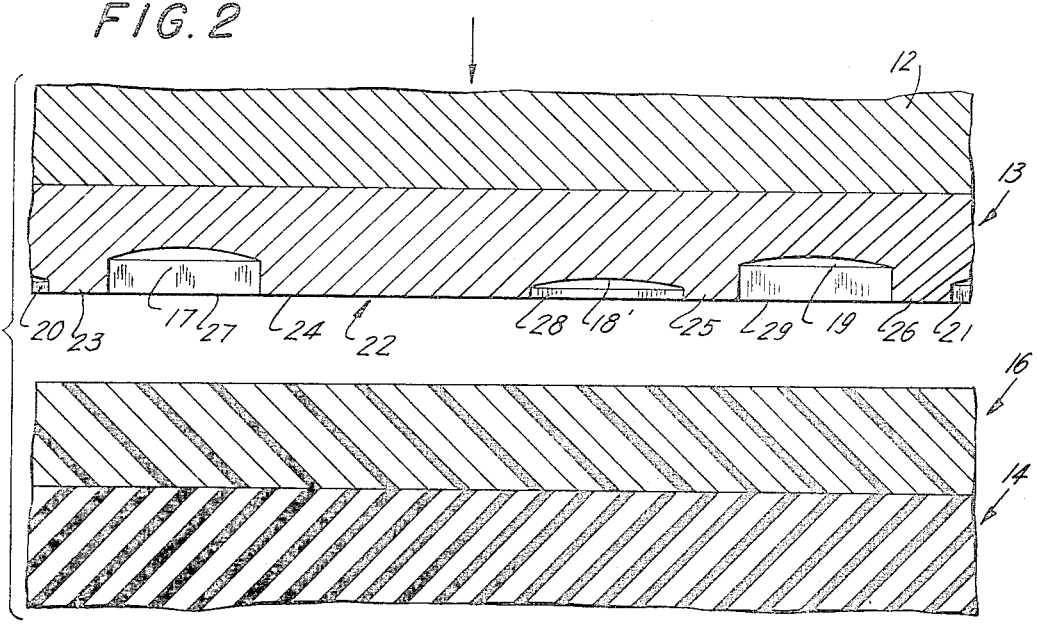
FIGURE 2 is an enlarged, fragmentary cross-sectional view of the intaglio etched member and the resilient support of the apparatus shown in FIGURE 1 showing a film in position for embossing.

FIGURE 2 is an enlarged fragmentary cross-sectional view of the apparatus in FIGURE 1 showing a fragmentary view of intaglio etched member 13, thermoplastic film 16 and a fragmentary portion of resilient backing member 14 in a disengaged position. The intaglio etched member consists of a plurality of microscopic cells respectively enumerated as 17, 18 and 19 with a fragmentary portion of microscopic cells 20 and 21 being also shown. Microscopic cells 17, 18 and 19 are shown to have a uniform width, however these microscopic cells are non-uniform as to depth.

Each microscopic cell is suitably profiled by an unetched portion of the intaglio etched member which is hereinafter referred to as a landed portion 22 with a particle wall between microscopic cells being referred to as a land. Land 23 forms as a longitudinal wall between fragmentary microscopic cell 20 and microscopic cell 17. With lands 24, 25 and 26 respectively forming the longitudinal walls for microscopic cells 17 and 18, 18 and 19, and 19 and fragmentary microscopic cell 21. Also shown in the recessed portion of the microscopic cells are lateral lands 27, 28 and 29. These lateral walls serve as dividers or lands for other microscopic cells not shown.

In order to provide intricately designed, thermoplastic sheets or films, it is critical that the intaglio etched member have a plurality of microscopic cells wherein each respective cell has a cross-sectional dimension (i.e., the maximum linear distance from a particular point along the peripheral edge of the microscopic cell to any other point located along the peripheral edge of the microscopic cell) of no greater than 22 mils and no less than 8.5 mils, a cross-sectional area (i.e. the area enclosed within the peripheral or within the cell wall of the microscopic cells) ranging from 36 square mils to 230 square mils and a depth ranging from 4 microns to 80 microns.

For better embossing results it is advantageous to employ an intaglio etched member having a cross-sectional dimension ranging from about 11 mils to about 18 mils and a cross-sectional area ranging from about 60 to about 162 square mils with optimum results being achieved when the cross-sectional dimension is about 13 mils and the cross-sectional area is about 85 square mils. The respective microscopic cells within the intaglio etched member can be uniform in respect to cross-sectional dimensions as well as cross-sectional area but in order to provide contrast they must necessarily have a different depth. If the depth of the respective microscopic cells within the intaglio etched member remains constant, the degree of contrast is provided by changing either solely or together the cross-sectional area and cross-sectional dimension of the microscopic cells.

Each microscopic cell should be suitably profiled with a land of sufficient area to prevent the flow of the heated thermoplastic film about the land into the microscopic cell. By providing a land of at least .5 mil between adjacent microscopic cells, the flow of heated thermoplastic film in close proximity of the land will be prevented from progressing into the adjacent microscopic cells. Advantageously the distance between adjacent microscopic cells provided by the land is at least .75 mil with a distance of at least about 1.0 mil being preferred.

Figure 3:
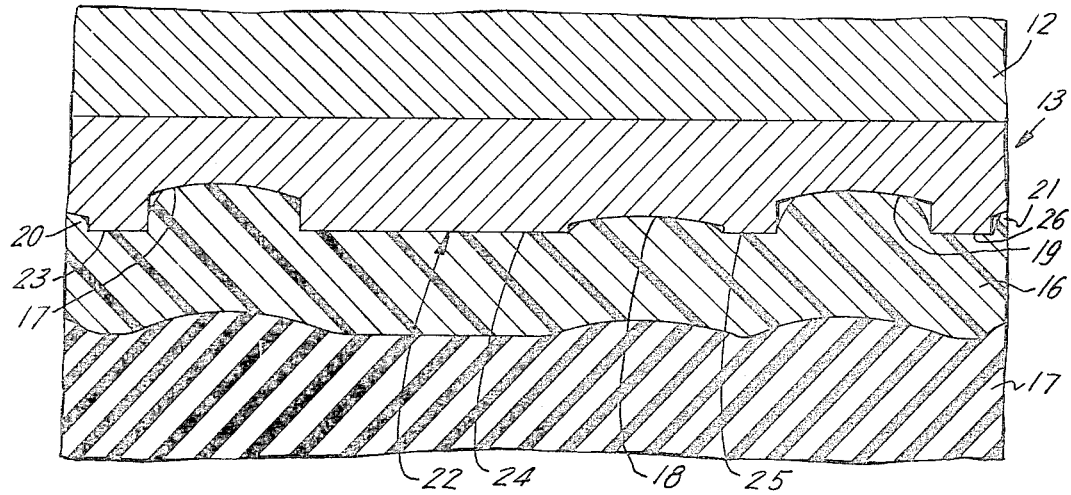
FIGURE 3 is a view of the member shown in FIGURE 2 engaged in effectuating an intricately embossed design in the thermoplastic film.

FIGURE 3 shows the apparatus of FIGURE 2 engaged in effectuating an intricately designed thermoplastic. As shown, the resiliently supported film 16, which is maintained at a temperature above its softening point, is compressed between the intaglio etched member 13 and the resilient backing member 14 with a pressure sufficient to force that portion of the thermoplastic film 16 in close proximity of microscopic cells 17, 18, 19, 20 and 21 into the respective microscopic cells, as illustrated, whereas that portion of the heated film in close proximity of the landed portion 22 such as that about lands 23, 24, 25, and 26 remains relatively unchanged.

Figure 4:
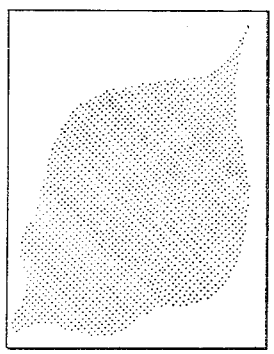
FIGURE 4 illustrates a plan view of an intaglio etched member which is adaptable to the apparatus shown in FIGURE 1.

FIGURE 4 is a plan view of an intaglio etched member employable in the invention wherein the microscopic cells are arranged such that a leaf-like image is produced. Such an image is typical of the intricate designs that are produced by employing the method of the invention, sheet-like thermoplastic materials having a much more complicated design than heretofore known can be prepared. The embossed articles provided herein are no longer dependent upon the skill of the artisan preparing the embossing plates. Via the present invention, it is now possible to reproduce photographic images upon an embossed article.

Figure 5:
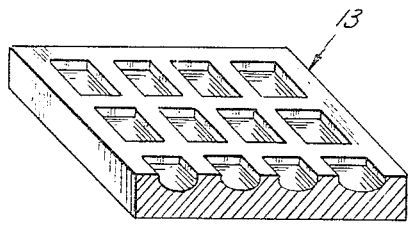
FIGURE 5 is an enlarged, fragmentary, perspective view, partially in cross-section, of the intaglio etched member shown in FIGURE 3.

FIGURE 5 is an enlarged, fragmentary, perspective view, partially in cross-section, of an intaglio etched member having square microscopic cells wherein each respective microscopic cell in relation to the other microscopic cells is uniform in respect to cross-sectional dimensions (i.e. the diagonal of the square) and cross-sectional area. The degree of contrast in the ultimate embossed product is supplied by changing the microscopic cell depth (i.e., the elevational difference between the landed portion to that of the deepest recession of the microscopic cell).

The degree of contrast in the embossed product results from the degree of distortion effectuated in a translucent thermoplastic film during the method of the invention. That portion of the film in proximity of the landed portion of the intaglio etched member remains relatively unchanged (i.e., it is not distorted) and consequently permits the passage of light through the film with the least amount of distortion. As the depth of the respective microscopic cell increase, the amount of distortion imparted to the plastic film increases. This increased distortion to film causes the area of film, effected in proximity of a deeper microscopic cell to have a darker appearance than areas in proximity of one of shallower depth. By grouping the microscopic cells in a manner similar to that employed with conventional plates in the photo-engraving printing art, embossed films having intricate designs such as common in the printing art, can readily be prepared.

Figure 6:
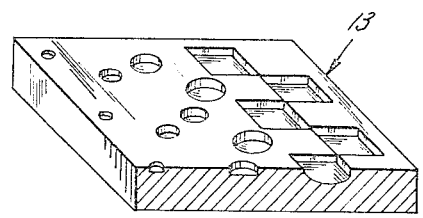
FIGURE 6 is an enlarged, fragmentary, perspective view, partially in cross-section, of a Dultgen plate employable in the method of the invention.

FIGURE 6 is an enlarged fragmentary, cross-sectional view of an intaglio etched member employable herein wherein the microscopic cells vary both as to size and depth. In the printing art this type of plate is commonly referred to as a "Dultgen plate." As previously discussed herein, those microscopic cells of the greater depth provide a greater degree of distortion when employed in the method of the invention. When Dultgen plates are employed herein, the degree of distortion imparted to the embossed film is accomplished by changing the cross-sectional area the cross-sectional dimension of each microscopic cell.

Dultgen plates are prepared by employing two sets of positives. One set is a continuous-tone positive as in the conventional gravure. The other set is made by photographing the negative through a photo-engravers screen. This has the effect of breaking the illustration up into opaque dots of varying size and shape. To give a shading of various colors there are employed two positives for each color. Thus for a four color job there are eight positives employed.

Figure 7:
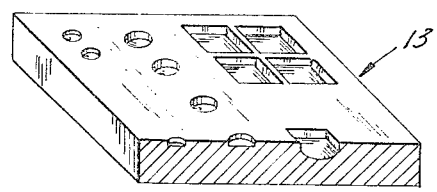
FIGURE 7 is also an enlarged, fragmentary perspective view, partially in cross-section, of a reverse halftone plate employable in the method of the invention.

FIGURE 7 is an enlarged, fragmentary, cross-sectional view of an intaglio etched member wherein the size and shape of the microscopic cells are different but the depth of each microscopic cell in relation to one another is the same. The larger microscopic cells produce the solids while the progressively smaller cells produce the tone gradation. These plates are commonly referred to in the printing art as "reverse-halftone" plates. Reverse-halftone plates are made by breaking the illustration into varying size dots by use of a photo-engravers screen.

An intaglio etched member having a plurality of microscopic cells similar to that illustrated in FIGURE 5 wherein each respective cell is uniform in respect to cross-sectional area and cross-sectional dimension but varying as to depth can readily be prepared by methods similar to those employed in the printing art in making deep-etched, conventional plates or cylinders. In general these intaglio etched members can be prepared by a conventional resin grain photogravure process. This is accomplished with a sheet of carbon tissue (paper coated on one side with a pigmented gelatin layer on the other), previously sensitized with a bichromate. This carbon tissue is exposed to light with a continuous-tone positive.

The "Lands" or unetched portion of the intaglio etched member which form the microscopic cells are prepared by placing a screen consisting of a series of tarnsparent lines and opaque dots, having the dimensions of the microscopic cell herein disclosed, upon the sensitized carbon tissue. These opaque dots are usualy square in nature but may be circular, elliptical, polygonal or of any other similar form. The opaque dots are arranged on the screen in a uniform checkerboard manner such that the median of the transparent lines form a series of parallel lines running both longitudinally and laterally acros the screen. The sensitized carbon tissue having the screen in direct contact thereto is then exposed to light via an arc lamp.

Satisfactory screens for forming the microscopic cells of the invention range from 50 to 130 lines per inch. Advantageously the screens employed have from about 60 to about 95 lines per inch with those having about 85 lines per inch being preferred.

The light exposed carbon tissue is then moistened with water and squeezed into contact with the clean copper plate, warm water is then applied and the paper of the carbon tissue is peeled off. The gelatin thus transferred to copper surface is further developed with warm water to produce a gelatin resist. Etching is done with a 37–45° Bé., ferric chloride solution. This solution etches the copper to different depths, depending on the thickness of the gelatin resist in the different tone areas. The areas corresponding to the screen lines remain unetched and provide "lands" in the plates. Under-cutting of the lands as well as a non-symmetrical cell structure can be avoided by repeating the process until the desired cell depth is achieved. The etched intaglio copper member is then electroplated with a thin layer of chrome to protect the intaglio member against normal attrition encountered during the method of the present invention. For a more detailed description as to the manner in which conventional printing plates are prepared reference is made to pages 125 through 129 of Encyclopedia of Chemical Technology, volume 11, (c) 1953, published by The Interscience Encyclopedia, Inc., New York, New York.

Figure 8:
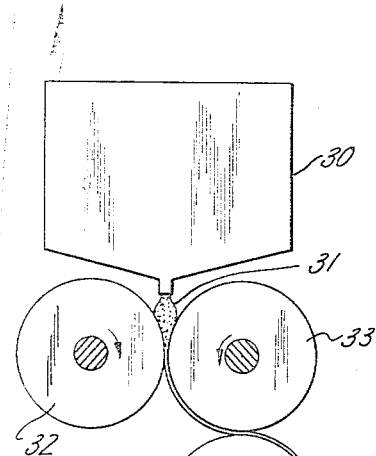
FIGURE 8 is a diagrammatic representation of one method of continuously practicing the invention.
Figure 8:
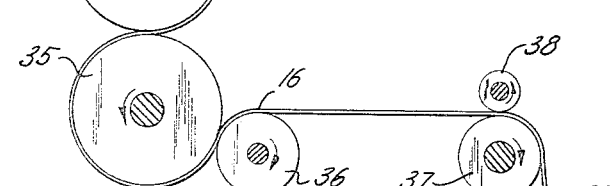

Referring to FIGURE 8 of the drawings, the embodiment of the invention illustrated therein involves fusing a blended thermoplastic polymer mix in a mixer 30 and squeezing the hot doughy, thermoplastic mix 31 issuing from the mixer 30 between a series of internally heated rolls, respectively enumerated as 32, 33, 34, and 35 from which the mix 31 emerges as a flat sheet or film 16 of uniform and predetermined thickness. The film 16 issuing from the internally heated rolls is then passed about a guide roll 36, which can also be internally heated, and then between an intaglio etched roll 37 and resilient roll 38, the position of which can be interchanged. Intaglio etched roll 37, which can be an integral unit, and resilient roll 38 are placed sufficiently close to the heated rolls so that the film 16 passing therein is maintained above its softening point. Between etched roll 37 and resilient roll 38 the heated film 16 is compressed with a pressure sufficient to force the heated film into the microscopic cells of the etched roll 37. After passing between the etched roll 37 and resilient roll 38, the embossed film 39 is cooled softening point. Between etched roll 37 and resilient roll 38 may consist of a neoprene rubber covering ⅜" to 1" thick having a durometer hardness, for example, from 40 to 90 (A scale).

As shown in FIGURE 8 the resilient roll 38 and the etched roll 37 can have diameters which are different. When resilient rolls and etched rolls having different diameters are employed, each respective roll should be operated so that they are traveling at the same rate of speed about their outer circumferences. Accordingly, if both rolls have the same diameter, they should be operated at the same number of r.p.m.'s so that the filim passes between them at a uniform rate.

FIGURE 8 illustrates the manner in which a method for preparing the film 16 can be combined with the method of embossing the film. A more simplified embodiment of the invention would eliminate the mixer 30 as well as internally heated rolls 32, 33, 34 and 35. Accordingly a roll of film is appropriately positioned such that the film unwinding therefrom passes through a heated zone, e.g., a row of heat lamps, an oven, heated cylinder, and then between the intaglio etched roll 37 and resilient roll 38. The issuing embossed film is then appropriately cooled, a chilling ring, a liquid cooling medium or a cooled cylinder and then onto a windup roll 40.

Figure 9:
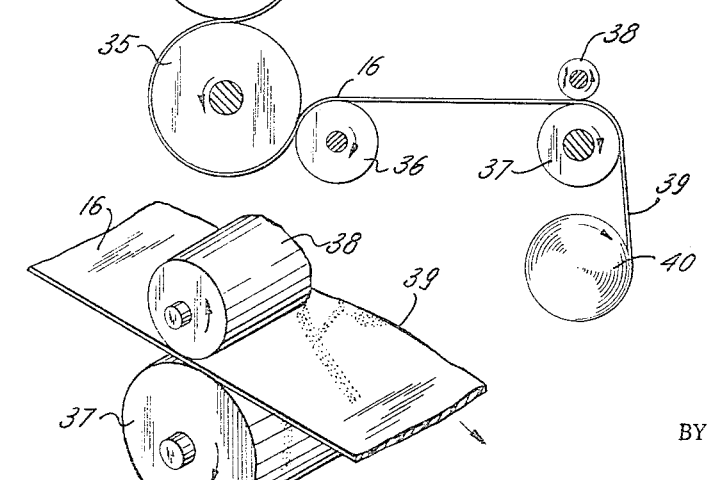
FIGURE 9 is a fragmentary, perspective view of the resilient backing member and the intaglio etched member engaged in effectuating an intricately designed thermoplastic film.

FIGURE 9 is a fragmentary perspective view of the heated film 16 passing between the intaglio etched roll 37 and resilient roll 38 with the embossed film 39 issuing therefrom.

It has been found that better results may be achieved if the intaglio etched member is maintained at a temperature below the softening temperature of the film being embossed. Generally a temperature differential of about 25° F. is sufficient for this purpose however an intaglio etched member maintained at least 40° F. below the softening temperature of the film is preferred. Deterioration of the resilient roll and adherence of the heated thermoplastic film thereto, can be prevented by similarly cooling the resilient roll. To insure a more adequate cooling means the intaglio etched member and resilient roll can be placed against or integrally connected to a water cooled unit which in turn acts as a heat absorber.

Thermoplastic materials adaptable to the method of the invention include both sheets and film thereof. When thick sheets are employed it is desirable to use a resilient backing member that has a low amount of depression; whereas for thin films, a backing member having a greater degree of depression is more suitable. Illustrative thermoplastic sheets or films adaptable to the method of the invention include those having a thicknes ranging from about .5 to about 50 mils with those having a thickness ranging from about 1 mil to about 25 mils being preferred.

It is not necessary that the thermoplastic resin be in planar sheets, although such is preferred in the practice of this invention. Curvilinear sheets, or continuous sheet forms as tubing or pipe, lay-flats or other similar shapes can be used. For purposes of this invention, and for use herein, all are referred to as "sheets."

The thermoplastic resin should be readily softened without degradation. However, the chemical nature of contents of the thermoplastic resins used in this invention is not at all critical. Typical of the thermoplastic resins which can be employed herein are olefin polymers and copylmers as well as other types of polymers including polycarbonates, poly(alkylene oxides) such as poly (ethylene oxide), poly(butylene oxide), polycarbonates, and other linear thermoplastics such as polyhydroxyethers. The lower softening temperature resins are preferred. Typical of preferred thermoplastics employable herein include polyvinyl chloride, copolymers of vinyl chloride and vinyl acetate, copolymers of vinylidene chloride and vinyl chlorides, polystyrene, polyethylene and polypropylene.

In order to promote the flow of certain thermoplastic films into the microscopic cell, the thermoplastic resin employed in the invention can be plasticized or even slightly swollen with solvents. Typical amounts of plasticizer range from about 5 parts to about 50 parts of plasticizer in 100 parts of resin with those resins containing from about 15 to about 45 parts of plasticizer in 100 parts of resin being preferred, particularly with vinyl halide polymers.

Plasticizers which are employable herein differ from one plastic to another. For a more detailed description as to plasticizers employable herein, reference is made to The Technology of Solvents and Plasticizers, by Arthur K.

Doolittle (C) 1954, and published by John Wiley & Sons, Inc., New York, N.Y.

Also contemplated in the method of the invention are those thermoplastic films containing modifying agents such as colorants, antioxidants, antiblock agents, slip agents, ultraviolet inhibitors, stabilizers and the like which are conventionally added in minor amounts, e.g. usually less than 15 weight percent, to modify specific physical properties of the thermoplastic resin, or to stabilize the polymer against degradation by heat or oxidation.

In the method of the invention it is necessary to employ a resilient member of slow acting resilience to resiliently support the thermoplastic film and force the heated film into the microscopic cells. Typical resilient member include those having a depression ranging from 2 percent to 20 percent when subjected to force of 100 pounds per square inch for one minute. Advantageously included are thoe resilient members with a depression range from about 4 percent to about 10 percent when subjected to a force of 100 p.s.i. for one minute. Illustrative backing members are cork, plastics, rubbers, balsa wood, paperboard and other materials of similar resilience. Exemplary of a preferred backing member is hard rubber exhibiting non-directional elastic characteristics and having a durometer rating on a type A durometer ranging from about 40 to about 90 units.

What is claimed is:

1. A method for preparing intricately designed thermoplastic articles from thermoplastic sheets, which comprises heating a sheet of thermoplastic material having a thickness ranging from about .5 to about 50 mils to a temperature above the softening point of the thermoplastic; supporting the thermoplastic material with a resilient backing member having a resiliency as evidenced by a depression ranging from 2 to 20 percent when subjected to a force of 100 pounds per square inch for one minute; contacting the thermoplastic material with an intaglio etched rigid member having a plurality of microscopic cells, each respective cell having a cross-sectional dimension of no greater than 22 mils and no less than 8.5 mils, a cross-sectional area ranging from 36 square mils to 230 square mils and a depth ranging from 4 microns to 80 microns; compressing the resiliently supported thermoplastic material against the etched member with a pressure sufficient to force the thermoplastic material into the microscopic cells while maintaining the thermoplastic material at a temperature above the softening point of the thermoplastic material and thereafter cooling the thermoplastic material.

2. The method according to claim 1 wherein the plurality of microscopic cells have the same cross-sectional area and cross-sectional dimension.

3. A method for preparing an intricately designed thermoplastic material from relatively thin sheet-like thermoplastics which comprises heating a sheet of thermoplastic material having a thickness ranging from about .5 to about 50 mils to a temperature above the softening point of the thermoplastic material; resiliently supporting the thermoplastic material with a resiliency as evidenced by a depression ranging from 2 to 20 percent when subject to a force of 100 pounds per square inch for one minute; contacting the thermoplastic material with an intaglio etched member, the etched member having a plurality of microscopic cells, each respective cell having a cross-sectional dimension of no greater than 22 mils and no less than 8.5 mils, a cross-sectional area ranging from 36 square mils to 230 square mils and a depth ranging from 4 microns to 80 microns, and a landed portion separating each respective microscopic cell, the landed portion having sufficient cross-sectional dimension and cross-sectional area to prevent the progression of thermoplastic material in close proximity thereof into adjacent microscopic cells; maintaining the thermoplastic material at a temperature above the softening point of the thermoplastic material and compressing the resiliently supported thermoplastic material against the etched member with a pressure sufficient to force the thermoplastic material into the microscopic cells and thereafter cooling the thermoplastic material.

4. The method according to claim 3 wherein the cross-sectional dimension of the landed portion between adjacent microscopic cells is at least .5 mil and the microscopic cells have a cross-sectional dimension ranging from about 11 to about 18 mils and the cross-sectional area ranging from about 60 to about 160 square mils.

5. The method according to claim 3 wherein the thermoplastic material is a vinyl chloride polymer.

6. The method according to claim 5 wherein the thermoplastic material is poly(vinylchloride) having a thickness ranging from about 1 to about 25 mils.

7. A method for preparing an intricately designed thermoplastic article from thin sheet-like thermoplastics which comprises heating a thermoplastic sheet-like material having a thickness ranging from .5 to about 50 mils to a temperature above the softening point of the thermoplastic material; resiliently supporting the thermoplastic material with a resiliency as evidenced by a depression ranging from 2 to 20 percent when subjected to a force of 100 pounds per square inch for one minute; contacting the thermoplastic material with an intaglio etched member, the etched member having a plurality of microscopic cells, each respective cell having a cross-sectional dimension of no greater than 22 mils and no less than 8.5 mils, a cross-sectional area ranging from 36 square mils to 230 square mils and a depth ranging from 4 microns to 80 microns, each respective microscopic cell being profiled by a landed portion, the landed portion having a cross-sectional dimension of at least .5 mil; maintaining the etched member at a temperature less than that of the heated thermoplastic material; compressing the resiliently supported thermoplastic material at a temperature above the softening point of the thermoplastic material, against the etched member with a force sufficient to force the thermoplastic material into the microscopic cells and thereafter cooling the thermoplastic material.

8. The method according to claim 7 wherein each respective microscopic cell has a cross-sectional dimension ranging from about 11 mils to about 18 mils and a cross-sectional area ranging from about 60 to about 160 square mils.

9. The method according to claim 8 wherein the plurality of microscopic cells have the same cross-sectional dimension and same cross-sectional area.

10. The method according to claim 9 wherein the thermoplastic material is a vinyl chloride polymer.

11. An apparatus for preparing an intricately designed thermoplastic material from thin sheet-like thermoplastics comprising, in combination, means for resiliently supporting a thermoplastic material, the resiliently supporting means having a resiliency as evidenced by a depression ranging from 2 to 20 percent when said means is subjected to a force of 100 p.s.i. for one minute; an intaglio etched member, the etched member having a plurality of microscopic cells, each respective cell having a cross-sectional dimension of no greater than 22 mils or no less than 8.5 mils, a cross-sectional area ranging from 36 square mils to 230 square mils and a depth ranging from 4 microns to 80 microns; means for heating the thermoplastic material to a temperature above the softening point of the thermoplastic material; means for applying pressure to the etched member so that the thermoplastic material positioned between the etched member and the resilient backing support means will flow into the microscopic cells and means for cooling the thermoplastic material below the softening temperature of the thermoplastic material.

12. An apparatus for preparing an intricately designed thermoplastic material from thin sheet-like thermoplastics comprising, in combination, means for resiliently supporting a thermoplastic material, the resiliently supporting means having a resiliency as evidenced by a depression ranging from 2 to 20 percent when said means is subjected to a force of 100 p.s.i. for one minute; an intaglio etched member, the etched member having a plurality of microscopic cells, each respective cell having a cross-sectional dimension of no greater than 22 mils or no less than 8.5 mils with a cross-sectional area ranging from 36 square mils to 230 square mils and a depth ranging from 4 microns to 80 microns, each respective microscopic cell being profiled by a landed portion, the landed portion having a cross-sectional dimension of at least .5 mil; means for heating thermoplastic material to a temperature above the softening of the thermoplastic material; means for applying pressure to the etched member so that the thermoplastic material positioned between the etched member and the resilient backing support means will flow into the microscopic cells and means for cooling the thermoplastic material below the softening temperature of the thermoplastic material.

13. The apparatus according to claim 12 wherein the etched member is provided with means for cooling the etched member to a temperature less than that of the thermoplastic material being embossed.

References Cited by the Examiner

UNITED STATES PATENTS

| | | | |
|---|---|---|---|
| 2,578,209 | 12/1951 | Schwartz | 264—293 |
| 2,722,038 | 11/1955 | Freund | 101—32 XR |
| 2,996,822 | 8/1961 | Souza | 264—293 XR |
| 3,113,342 | 12/1963 | Halpern et al. | 264—293 XR |
| 3,221,654 | 12/1965 | Jernt | 264—92 XR |

FOREIGN PATENTS 550,534    1/1943    Great Britain.

ROBERT F. WHITE, *Primary Examiner.*

ALEXANDER H. BRODMERKEL, *Examiner.*

R. R. KUCIA, M. R. DOWLIN, *Assistant Examiners.*